(12) United States Patent
Lan

(10) Patent No.: US 11,327,945 B2
(45) Date of Patent: May 10, 2022

(54) METHOD AND DEVICE FOR STORING HIGH-CONCURRENCY DATA

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Jian Lan, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 362 days.

(21) Appl. No.: 15/542,088

(22) PCT Filed: Jan. 7, 2016

(86) PCT No.: PCT/CN2016/070397
§ 371 (c)(1),
(2) Date: Jul. 7, 2017

(87) PCT Pub. No.: WO2016/110263
PCT Pub. Date: Jul. 14, 2016

(65) Prior Publication Data
US 2018/0276265 A1   Sep. 27, 2018

(30) Foreign Application Priority Data
Jan. 8, 2015  (CN) .......................... 201510009667.2

(51) Int. Cl.
G06F 16/23     (2019.01)
G06F 16/2458  (2019.01)
G06F 16/27     (2019.01)

(52) U.S. Cl.
CPC ...... *G06F 16/2308* (2019.01); *G06F 16/2471* (2019.01); *G06F 16/278* (2019.01)

(58) Field of Classification Search
CPC .... G06F 16/2308; G06F 9/4881; G06F 9/546; G06F 16/2471; G06F 16/278
See application file for complete search history.

(56) References Cited

U.S. PATENT DOCUMENTS 6,137,782 A * 10/2000 Sharon .................... H04L 41/12
                                                                370/244
6,321,265 B1 * 11/2001 Najork ................ G06F 16/9574
                                                                709/224
(Continued)

FOREIGN PATENT DOCUMENTS

CN     101739296 A    6/2010
CN     103024014 A    4/2013
(Continued)

OTHER PUBLICATIONS

Dickinson, J, et al., RFC 7766—DNS Transport over TCP—Implementation Requirements, Mar. 2016, Internet Engineering Task Force (IETF), p. 9 (Year: 2016).*
(Continued)

*Primary Examiner* — James Trujillo
*Assistant Examiner* — Michal Bogacki
(74) *Attorney, Agent, or Firm* — Michael Best & Friedrich LLP

(57) ABSTRACT

A method and device for storing high-concurrency data. The method comprises: receiving high-concurrency data sent from a plurality of clients (110); pushing the high-concurrency data into a primary data queue, and responding to a corresponding client (120); consuming the high-concurrency data in the primary data queue by using multithreading (130); fragmenting the high-concurrency data according to the number of local queues (140); pushing the fragmented
(Continued)

high-concurrency data into the local queues (150); and consuming the high-concurrency data in the local queues and storing the high-concurrency data in a database (160). By means of data asynchronous storage, high-concurrency data is temporarily stored in the primary data queue and the local queues, thereby alleviating pressure on the database, avoiding the problem of a database crash in the case of a high-concurrency storage, and improving the efficiency of storing high-concurrency data.

4 Claims, 4 Drawing Sheets

(56) References Cited

U.S. PATENT DOCUMENTS

| | | | | |
|---|---|---|---|---|
| 6,886,041 B2* | 4/2005 | Messinger | ............ | G06F 9/5038 709/203 |
| 6,922,724 B1* | 7/2005 | Freeman | ................ | G06F 9/505 709/223 |
| 7,171,613 B1* | 1/2007 | Alexander | ............ | G06Q 10/10 707/999.01 |
| 8,161,167 B2* | 4/2012 | Bagepalli | .............. | H04L 63/166 709/227 |
| 9,436,532 B1* | 9/2016 | Chandrasekaran | ..... | G06F 9/546 |
| 2003/0004949 A1* | 1/2003 | Hong | .................... | G06F 16/284 |
| 2007/0005801 A1* | 1/2007 | Kumar | .................... | H04L 63/08 709/238 |
| 2007/0192431 A1* | 8/2007 | Liu | .................... | H04L 67/2823 709/217 |
| 2008/0084866 A1* | 4/2008 | Johnson | .................. | H04L 45/00 370/351 |
| 2010/0332593 A1* | 12/2010 | Barash | .................. | H04L 63/145 709/203 |
| 2011/0016123 A1* | 1/2011 | Pandey | ............... | G06F 16/2308 707/737 |
| 2011/0302583 A1 | 12/2011 | Abadi et al. | | |

FOREIGN PATENT DOCUMENTS

| | | |
|---|---|---|
| CN | 104102693 A | 10/2014 |
| CN | 104598563 A | 5/2015 |
| RU | 2286595 C2 | 10/2006 |
| WO | 2012/153376 A1 | 11/2012 |

OTHER PUBLICATIONS

Stretch (), Understanding TCP Sequence and Acknowledgement Numbers, Jun. 7, 2010, PacketLife.net, pp. 4-7. (Year: 2010).*
Bellis, R., DNS Transport over TCP—Implementation Requirements, IETF, Aug. 2010, RFC: 5966, p. 2, <https://tools.ietf.org/html/rfc5966> (Year: 2010).*
International Search Report with English translation and Written Opinion for Application No. PCT/CN2016/070397 dated Apr. 13, 2016 (10 pages).
WEB+DBPRESS, Chapter 4 Task Management Attempt on Job Scheduling Quartz, 2005.
Indonesia Patent Office Action for Application No. P00201704357 dated Jun. 13, 2019 (2 pages, English translation included).
Japan Patent Office Action for Application No. 2017-554633 dated Jul. 10, 2018.
Russia Patent Office Action for Application No. 2017128080 dated Jul. 10, 2018.

\* cited by examiner

METHOD AND DEVICE FOR STORING HIGH-CONCURRENCY DATA

CROSS-REFERENCE TO RELATED APPLICATIONS

This application is a national stage filing under 35 U.S.C. 371 of International Application No. PCT/CN2016/070397 filed Jan. 7, 2016, which claims the foreign priority benefit of Chinese Patent Application No. 201510009667.2 filed Jan. 8, 2015, which are incorporated by reference herein in their entireties.

TECHNICAL FIELD

The embodiments of the invention relate to data processing technology, in particular a method and device for storing high-concurrency data.

BACKGROUND ART

With the explosive growth of Internet information, more and more Internet servers will be in a high concurrency and massive data environment, in which the problem of high concurrency-data storage is encountered. In order to solve the problem, some NoSql (Not Only SQL, a non-relational database) languages such as Hadoop® provided by The Apache Software Foundation, MongoDB® provided by MongoDB, Inc. and Hbase® provided by The Apache Software Foundation have been widely used.

However, for some old business systems, the costs of replacing new storage methods will be relatively large, so traditional relational databases such as MySql® provided by the Oracle Corporation, Oracle® provided by the Oracle Corporation and so on are still used for storing data. When the system is facing high-concurrency data storage, it will lead to too many links to the database, taking up too many resources, lowering the storage efficiency and further resulting in problems such as server downtime.

SUMMARY OF THE INVENTION

In view of the above, the embodiments of the present invention provide a method and device for storing high-concurrency data to improve the efficiency of storing high-concurrency data.

In the first aspect, the embodiments of the present invention provide a method for storing high-concurrency data, characterized in comprising:

receiving high-concurrency data sent from a plurality of clients;

pushing the high-concurrency data into a primary data queue, and responding to a corresponding client;

consuming the high-concurrency data in the primary data queue using multithreading;

fragmenting the high-concurrency data according to the number of local queues;

pushing the fragmented high-concurrency data into the local queues; and consuming the high-concurrency data in the local queues and storing the high-concurrency data in a database.

In the second aspect, the embodiments of the present invention further provide a device for storing high-concurrency data, the device comprising:

a receiving module for receiving high-concurrency data sent from a plurality of clients;

a first pushing module for pushing the high-concurrency data into a primary data queue, and responding to a corresponding client;

a consuming module for consuming the high-concurrency data in the primary data queue using multithreading;

a fragmenting module for fragmenting the high-concurrency data according to the number of local queues;

a second pushing module for pushing the fragmented high-concurrency data into the local queues; and a storing module for consuming the high-concurrency data in the local queues and storing the high-concurrency data into a database.

In the embodiments of the invention, by pushing the high-concurrency data into a primary data queue, consuming the high-concurrency data in the primary data queue using multithreading, fragmenting the high-concurrency data according to the number of local queues, pushing the fragmented high-concurrency data into the local queues, and consuming the high-concurrency data in the local queues and storing the high-concurrency data in a database. The high-concurrency data are buffered by the primary data queue and the local queues, and data are stored by means of asynchronous storage, thereby alleviating the pressure on the database by storing the high-concurrency data directly into a database, avoiding the problem of a database downtime in the case of a high-concurrency storage, and improving the efficiency of storing high-concurrency data.

DETAILED DESCRIPTION OF INVENTION

Figure 1:
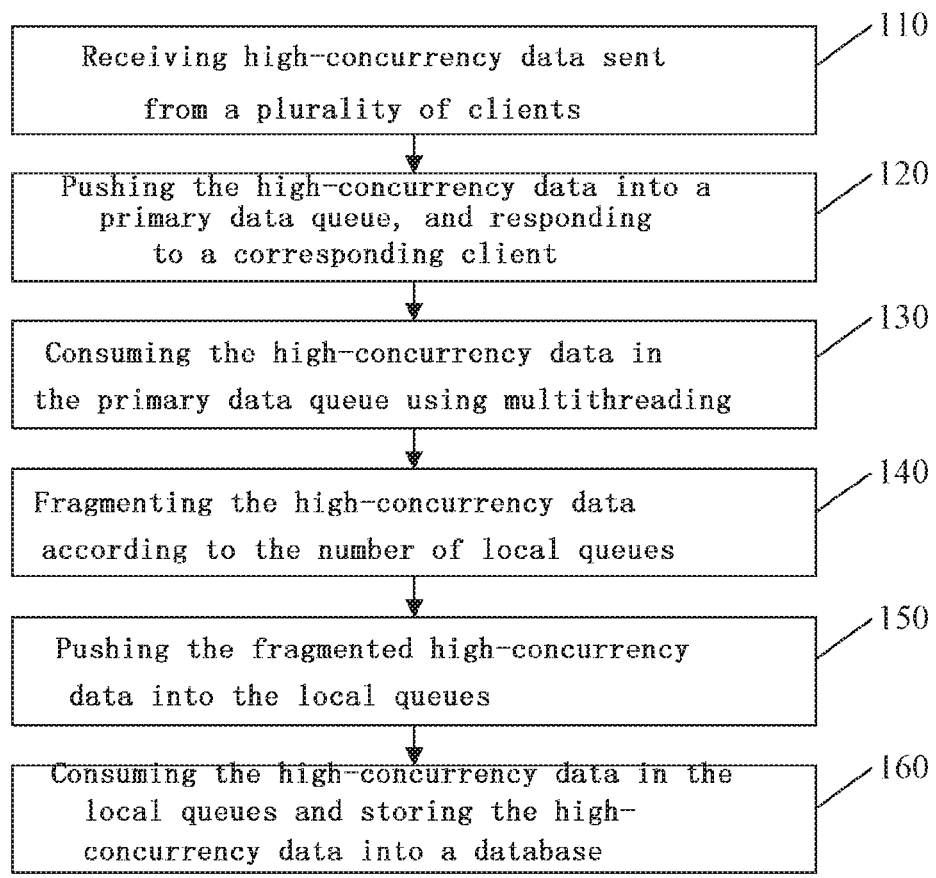
FIG. 1 is a flow chart of the method for storing high-concurrency data according to Embodiment 1 of the present invention.

The invention will now be described in further detail with reference to the accompanying drawings and embodiments. It is to be understood that the specific embodiments described herein are for the purpose of explaining the invention only and not intended to limit the invention. It is to be noted that, only the parts related to the present invention rather than the entire contents are shown in the drawings for the sake of convenience of description.

Embodiment 1

FIG. 1 is a flow chart of the method for storing high-concurrency data according to Embodiment 1 of the present invention. The embodiment is suitable to storing high-concurrency data. The method may be performed by a sever, and specifically comprises the following steps:

Step 110 involves receiving high-concurrency data sent from a plurality of clients.

High-concurrency means relatively large traffic at a certain time. A server receives requests from a plurality of clients, and the simultaneous requests from the plurality of clients create high-concurrency data.

Step 120 involves pushing the high-concurrency data into a primary data queue, and responding to a corresponding client.

The data queues adopt distributed MQ (Message Queue), which can support distributed extensions and endow the framework with high availability without impacting performance in processing big data. Among them, ActiveMQ® is a very popular and powerful open source message bus which is produced by The Apache Software Foundation.

After receiving the high-concurrency data, the server pushes the high-concurrency data to the primary data queue and responds to the client sending the high-concurrency data. The primary data queue is the primary entry queue for all data, and when the data is pushed to the queue the result is immediately returned, improving the response speed.

Step 130 involves consuming the high-concurrency data in the primary data queue by using multithreading.

The multithreading is assigned by a Thread Pool. The Thread Pool provides multithreading processing data, and fragments and pushes the data to a corresponding local queue, enhancing the consuming speed of a message, and meanwhile persisting data by utilizing the MQ characteristics to prevent data loss. The server rapidly consumes the high-concurrency data in the primary data queue by means of multithreading assigned by the Thread Pool. Consuming the high-concurrency data in the primary data queue denotes removing the high-concurrency data in the primary data queue therefrom.

Step 140 involves fragmenting the high-concurrency data according to the number of local queues.

The local queues are used for storing the fragmented high-concurrency data and preventing loss of the fragmented data. The local queues can be expanded horizontally according to the data amount of the high-concurrency data, and the number of local queues can be expanded in case of a large data amount. The server fragments the high-concurrency data removed from the primary data queue into fragments. The number of fragments the server fragments the high-concurrency data into is the number of local queues for storing the fragmented high-concurrency data. The high-concurrency data are subject to fragmenting processing, ensuring the data processing from repeating and improving processing speed. It will be appreciated by those skilled in the art that there are multiple strategies for fragmenting the high-concurrency data: it is possible to fragment the data according to a primary key feature thereof, by performing a modulo operation on the primary key of the high-concurrency data by the number of the local queues, and assigning the data to a local queue having the same serial number as the obtained result; it is optionally possible to fragment the data according to a time range, e.g., assign a first one million data to a first local queue, and assign a second one million data to a second local queue; of course, there are other fragmenting strategies.

Step 150 involves pushing the fragmented high-concurrency data into the local queues.

The server pushes the fragmented high-concurrency data to a corresponding local queue according to the fragmenting strategy for fragmenting the high-concurrency data, and the high-concurrency data are buffered in the local queue.

Step 160 involves consuming the high-concurrency data in the local queues and storing the high-concurrency data into a database.

The server consumes the high-concurrency data in the local queue, i.e., removes the high-concurrency data in the local queues therefrom, and then stores the high-concurrency data removed from the local queues into a database.

In the process of transferring the high-concurrency data (e.g., pushing the high-concurrency data into the primary data queue, consuming the data. etc.) in the embodiment, a high-performance JSON format can be used for transfer to facilitate serialization and deserialization of data to make the data transfer faster. As a lightweight data exchange format, JSON (JavaScript® Object Notation) is a JavaScript® (provided by the Oracle Corporation) syntax-based subset, i.e., arrays and objects. Serialization is a mechanism used for processing an object stream which streams the contents of the object, and the streamed object may be subject to reading and writing operations. Serialization is to solve a problem caused during the reading and writing operations of the object stream.

In the embodiment, by pushing the high-concurrency data into a primary data queue, consuming the high-concurrency data in the primary data queue by using multithreading, fragmenting the high-concurrency data according to the number of local queues, pushing the fragmented high-concurrency data into the local queues, and consuming the high-concurrency data in the local queues and storing the high-concurrency data into a database, the high-concurrency data are buffered by the primary data queue and the local queues, and data are stored by means of asynchronous storage, thereby alleviating the pressure on the database by storing the high-concurrency data directly in the database, avoiding the problem of database downtime in the case of high-concurrency storage, and improving the efficiency of storing high-concurrency data.

On the basis of the aforesaid technical solution, fragmenting the high-concurrency data according to the number of local queues preferably comprises:

performing a modulo operation on the primary key of the high concurrency data by the number of the local queues modulo a; and fragmenting corresponding high-concurrency data according to the same results of the modulo operation into one fragment.

A modulo operation on the primary key generated in the high concurrency data by the number of the local queues is performed firstly, and corresponding high-concurrency data with the same results of the modulo operation are fragmented into one fragment.

On the basis of the aforesaid technical solution, pushing the fragmented high-concurrency data into the local queues specifically comprises:

pushing the fragmented high-concurrency data into the local queues having corresponding serial numbers according to the results of the modulo operation.

wherein each local queue has a serial number of its own. The fragmented high-concurrency data are pushed into the local queue having the same serial number as the result of the modulo operation.

On the basis of any one of the above technical solutions, consuming the high-concurrency data in the local queues and storing the high-concurrency data into a database preferably comprises:

consuming the high-concurrency data in the local queues using timed scheduling; and storing the consumed high-concurrency data into the database.

The server removes the high-concurrency data in the local queues therefrom in a timed/instant manner using timed scheduling. A user can control the amount and time interval of data scraped (removed from the local queues), and store the high-concurrency data removed from the local queues in a timed/instant manner into a database. The timed/instant data processing function may be configured using timed scheduling to alleviate the storage pressure on the database. Preferably, the timed scheduling is implemented by Quartz® provided by Terracotta, Inc. owned by Software AG, wherein Quartz® is an open source job scheduling framework written entirely in Java® (provided by the Oracle Corporation).

Embodiment 2

Figure 2:
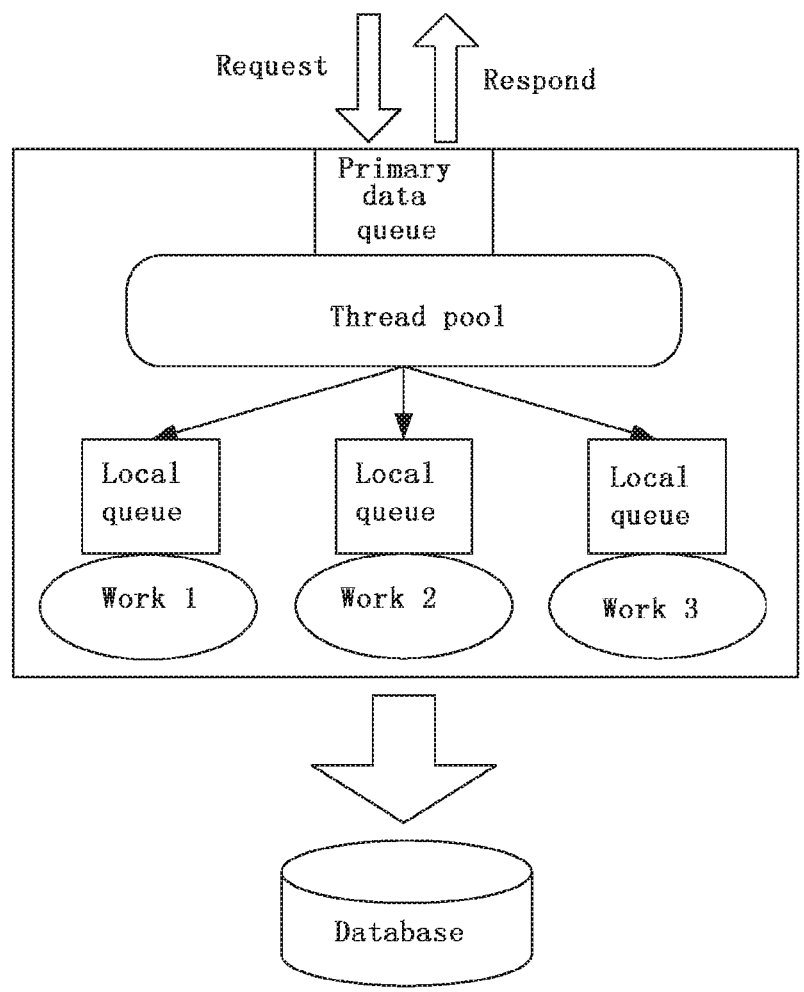
FIG. 2 is an architectural design of the method for storing high-concurrency data according to Embodiment 2 of the present invention.

FIG. 2 is an architectural design of a method for storing high-concurrency data provided in Embodiment 2 of the present invention. As shown in FIG. 2, the primary queue is a primary entry queue for all data. When the data is pushed to the queue, a result is returned immediately, improving the response speed. A Thread Pool provides multithreaded processing data, and fragments and pushes the data into corresponding local queues, enhancing consuming speed of a message while persisting data by utilizing the characteristics of MQ to prevent data loss. The local queues are used for storing fragmented data to prevent loss of the fragmented data; work 1, work 2, work 3 can control the amount and time interval of data scraped independently by consuming the data in a timed/instant manner, processing them and storing them into a database.

Figure 3:
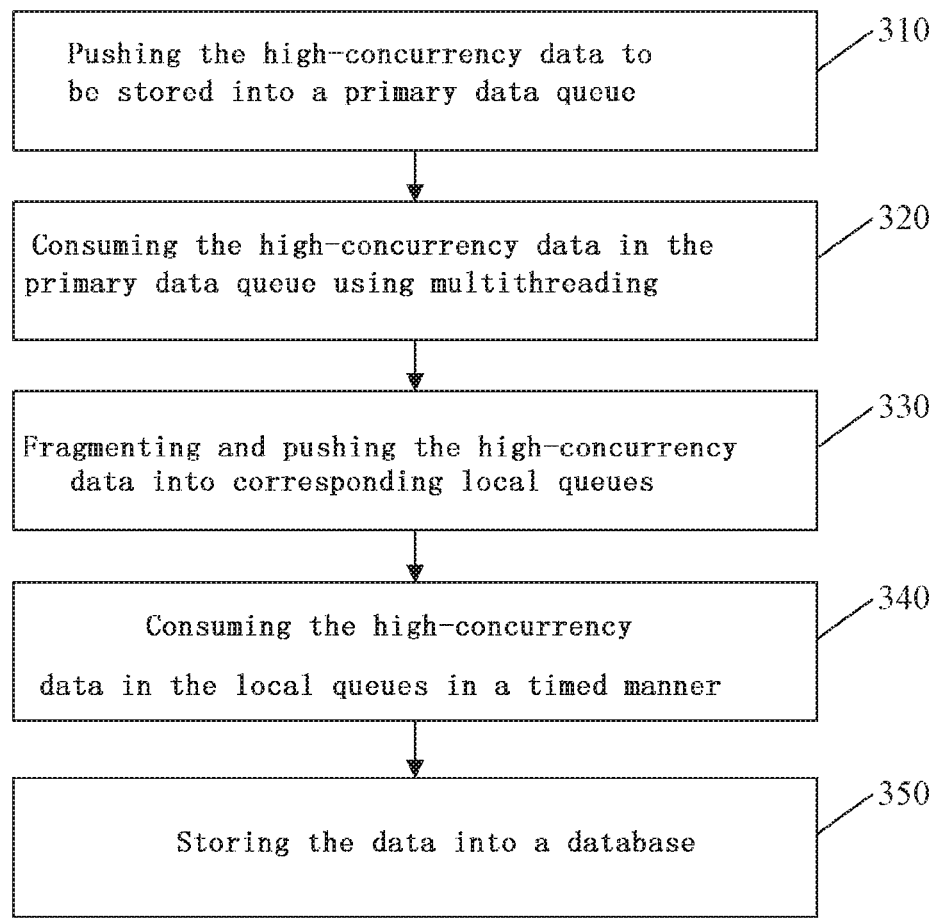
FIG. 3 is a flow chart of the method for storing high-concurrency data according to Embodiment 2 of the present invention.

FIG. 3 is a flow chart of a method for storing high-concurrency data provided in Embodiment 2 of the present invention. As shown in FIG. 3, the method for storing high-concurrency data provided in the embodiment specifically comprises the following steps:

Step 310 involves pushing the high-concurrency data to be stored into a primary data queue.

The high-concurrency data to be stored are pushed into a primary data queue firstly, and a result is returned after the high-concurrency data are pushed into the primary data queue to respond to a client.

Step 320 involves consuming the high-concurrency data in the primary data queue using multithreading.

The high-concurrency data in the primary data queue are consumed using multithreading provided by the Thread Pool.

Step 330 involves fragmenting the high-concurrency data and pushing them into corresponding local queues.

A modulo operation on a primary key of the high-concurrency data by the number of the local queues is performed according to the number of the local queues, and the fragmented high-concurrency data is pushed into the local queue having the same serial number as the result of the modulo operation based on the result of the modulo operation.

Step 340 involves consuming the high-concurrency data in the local queues as timed.

The high-concurrency data in the local queues are consumed in a timed/instant manner using Quartz®.

Step 350 involves storing the data into a database.

In the embodiment, for a conventional relational database, the high-concurrency data are buffered by the primary data queue, and are subject to a second data buffering by the local queues, whereby data loss can be prevented, consuming speed of the primary data queue can be improved, and the high-concurrency data storage efficiency can be enhanced. A timed/instant data processing function may be provided, alleviating the pressure on the database and avoiding the problem of a downtime in the case of a high-concurrency storage.

Embodiment 3

Figure 4:
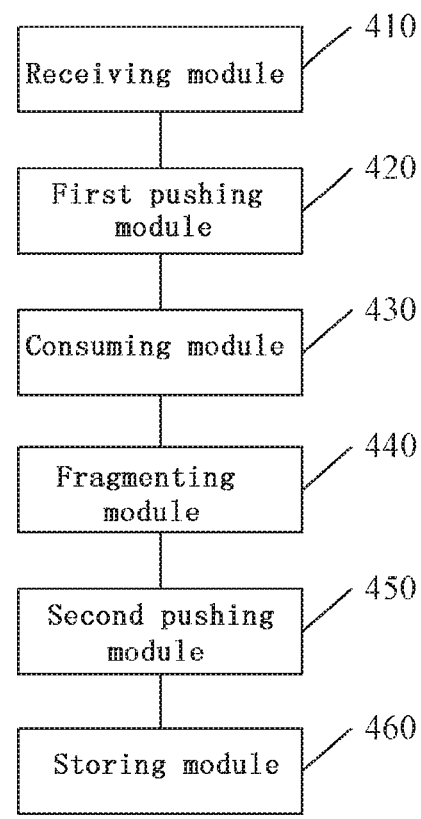
FIG. 4 is a schematic diagram of the device for storing high-concurrency data according to Embodiment 3 of the present invention

FIG. 4 is a schematic diagram of a device for storing high-concurrency data provided in Embodiment 3 of the present invention. The device for storing high-concurrency data provided in the embodiment is for implementing the method for storing high-concurrency data provided in Embodiment 1. As shown in FIG. 4, the device for storing high-concurrency data provided in the embodiment comprises a receiving module 410, a first pushing module 420, a consuming module 430, a fragmenting module 440, a second pushing module 450 and a storing module 460.

The receiving module 410 is used for receiving high-concurrency data sent from a plurality of clients; the first pushing module 420 is used for pushing the high-concurrency data into a primary data queue, and responding to a corresponding client; the consuming module 430 is used for consuming the high-concurrency data in the primary data queue using multithreading; the fragmenting module 440 is used for fragmenting the high-concurrency data according to the number of local queues; the second pushing module 450 is used for pushing the fragmented high-concurrency data into the local queues; and the storing module 460 is used for consuming the high-concurrency data in the local queues and storing the high-concurrency data into a database.

Preferably, the fragmenting module comprises a modulo sub-module for performing a modulo operation on a primary key of the high-concurrency data by the number of the local queues, and a fragmenting sub-module for fragmenting corresponding high-concurrency data according to same results of the modulo operation into one fragment. Preferably, the second pushing module is specifically for pushing the fragmented high-concurrency data into the local queues having corresponding serial numbers according to the results of the modulo operation.

Preferably, the storing module comprises a consuming sub-module for consuming the high-concurrency data in the local queues using timed scheduling, and a storing sub-module for storing the consumed high-concurrency data in the database. Preferably, the timed scheduling is implemented by Quartz®.

This embodiment is implemented by receiving high-concurrency data sent from a plurality of clients by the receiving module, pushing the high-concurrency data into a primary data queue and responding to a corresponding client by the first pushing module, consuming the high-concurrency data in the primary data queue using multithreading by the consuming module, fragmenting the high-concurrency data according to the number of local queues by the fragmenting module; pushing the fragmented high-concurrency data into the local queues by the second pushing module, and consuming the high-concurrency data in the local queues and storing the high-concurrency data into a database by the storing module. The high-concurrency data are buffered by the primary data queue and the local queues, and data are stored by means of asynchronous storage, thereby alleviating the pressure on the database by storing the high-concurrency data directly in the database, avoiding the problem of database downtime in the case of a high-concurrency storage, and improving the efficiency of storing the high-concurrency data.

It is noted that above are only preferred embodiments of the present invention and the technical principles used. It will be understood by those skilled in the art that the present invention is not limited to the specific embodiments described herein, and that various obvious changes, modifications and substitutions will be made by those skilled in the art without departing from the protection scope of the invention. Thus, although the present invention has been described in detail by way of the above embodiments, the present invention is not limited to the above embodiments, but may include more other equivalent embodiments without departing from the inventive concept. The scope of the present invention is determined by the scope of the appended claims.

The invention claimed is:

1. A method for storing data, the method comprising:
   receiving, from a plurality of clients, data to store at a database; and
   when requests to store data at the database are received at a predetermined rate
      pushing the data in a primary data queue, and responding to the plurality of clients the data was received from;
      removing the data from the primary data queue using multithreading assigned by a thread pool;
      fragmenting the data into a number of fragments, the number of fragments being the same as a number of local queues;
      pushing the fragmented data into the local queues; and
      removing the data from the local queues and storing the data in the database,
   wherein fragmenting the data based on a number of local queues comprises:
      performing a modulo operation on a primary key of the data by the number of local queues; and
      fragmenting the data based on a result of the modulo operation, and
   wherein removing the data from the local queues and storing the data in the database comprises:
      removing the data from the local queues using timed scheduling; and
      storing the removed data in the database.

2. The method according to claim 1, wherein pushing the fragmented data into the local queues comprises:
   pushing the fragmented data into a local queue having a serial number corresponding to the result of the modulo operation.

3. A hardware server for storing data, the hardware server configured to:
   receive, from a plurality of clients, data to store at a database; and
   when requests to store data at the database are received at a predetermined rate
      push the data into a primary data queue, and respond to the plurality of clients the data was received from;
      remove the data from the primary data queue using multithreading assigned by a thread pool;
      fragment the data into a number of fragments, the number of fragments being the same as a number of local queues;
      push the fragmented data into the local queues; and
      remove the data from the local queues and store the data in the database,
   wherein the hardware server is configured to fragment the data based on a number of local queues by
      performing a modulo operation on a primary key of the data by the number of local queues; and
      fragmenting the data based on a result of the modulo operation, and
   wherein the hardware server is configured to remove the data from the local queues and store the data in the database by
      removing the data from the local queues using timed scheduling; and
      storing the removed data in the database.

4. The hardware server according to claim 3, wherein the hardware server is configured to push the fragmented data into the local queues by pushing the fragmented data into a local queue having a serial number corresponding to the result of the modulo operation.

* * * * *